United States Patent
Dannenberg et al.

(10) Patent No.: US 9,617,004 B2
(45) Date of Patent: Apr. 11, 2017

(54) WATER SUPPLY MODULE

(75) Inventors: Andreas Dannenberg, Neu Wulmstorf (DE); Sebastian Flashaar, Handeloh-Hoeckel (DE)

(73) Assignee: Airbus Operations GmbH (DE)

( * ) Notice: Subject to any disclaimer, the term of this patent is extended or adjusted under 35 U.S.C. 154(b) by 907 days.

(21) Appl. No.: 13/259,913

(22) PCT Filed: Apr. 9, 2010

(86) PCT No.: PCT/EP2010/054722
§ 371 (c)(1),
(2), (4) Date: Nov. 2, 2011

(87) PCT Pub. No.: WO2010/118993
PCT Pub. Date: Oct. 21, 2010

(65) Prior Publication Data
US 2012/0186654 A1 Jul. 26, 2012

Related U.S. Application Data

(60) Provisional application No. 61/169,822, filed on Apr. 16, 2009.

(30) Foreign Application Priority Data

Apr. 16, 2009 (DE) .......... 10 2009 017 497

(51) Int. Cl.
*B64D 11/00* (2006.01)
*B64D 11/02* (2006.01)
(Continued)

(52) U.S. Cl.
CPC .......... *B64D 11/02* (2013.01); *B60R 15/00* (2013.01); *B64D 11/00* (2013.01); *E03C 1/05* (2013.01);
(Continued)

(58) Field of Classification Search
CPC .......... B64D 11/00; B64D 11/02; E03C 1/01
(Continued)

(56) References Cited

U.S. PATENT DOCUMENTS 3,741,195 A * 6/1973 Ellis .............................. 4/638
4,063,315 A 12/1977 Carolan et al.
(Continued)

FOREIGN PATENT DOCUMENTS

CH 336339 A 2/1959
DE 3440862 A1 5/1986
(Continued)

OTHER PUBLICATIONS

International Search Report, PCT/EP2010/054722, dated Jun. 24, 2010.

*Primary Examiner* — Kevin Murphy
(74) *Attorney, Agent, or Firm* — Lerner, David, Littenberg, Krumholz & Mentlik, LLP

(57) ABSTRACT

A water supply module 10' for a transportation means comprises a receiving connection 16' for receiving water from a supply line, a delivery connection 20' for delivering water to a faucet 30", a control connection 22' for receiving control commands of an actuating element 76 on the faucet 30", and a control unit 80. The control unit 80 is designed, on the basis of control commands of the actuating element 76, to adjust the delivery of water from the delivery connection 20' to the faucet 30". The water supply module 10' is designed as an assembly.

12 Claims, 5 Drawing Sheets

(51) Int. Cl.
*B60R 15/00* (2006.01)
*E03C 1/05* (2006.01)

(52) U.S. Cl.
CPC ........ *Y10T 29/494* (2015.01); *Y10T 137/0318* (2015.04); *Y10T 137/87249* (2015.04); *Y10T 137/87676* (2015.04)

(58) Field of Classification Search
USPC .............. 4/675, 695; 251/129.04; 137/15.01, 137/315.01, 315.12, 359, 377, 899.2
See application file for complete search history.

(56) References Cited

U.S. PATENT DOCUMENTS

| | | | |
|---|---|---|---|
| 4,457,031 A * | 7/1984 | Moore | 4/614 |
| 4,965,894 A * | 10/1990 | Baus | 4/605 |
| 4,974,636 A * | 12/1990 | Cogger | 137/625.17 |
| 5,261,440 A | 11/1993 | Frank | |
| 5,303,739 A * | 4/1994 | Ellgoth et al. | 137/899.2 |
| 5,699,833 A * | 12/1997 | Tsataros | 137/624.11 |
| 6,327,718 B1 * | 12/2001 | Ono et al. | 4/420.2 |
| 6,478,285 B1 * | 11/2002 | Bergmann | 251/129.03 |
| 2006/0150316 A1 | 7/2006 | Fukuizumi et al. | |
| 2007/0069078 A1 | 3/2007 | Hoffjann et al. | |
| 2007/0214562 A1 * | 9/2007 | Becker et al. | 4/598 |

FOREIGN PATENT DOCUMENTS

| | | |
|---|---|---|
| DE | 3822098 A1 | 1/1990 |
| DE | 4202719 A1 | 8/1993 |
| DE | 20009957 U1 | 8/2000 |
| WO | 2004/071867 A1 | 8/2004 |

\* cited by examiner

WATER SUPPLY MODULE

CROSS-REFERENCE TO RELATED APPLICATIONS

This application is a national phase entry under 35 U.S.C. §371 of International Application No. PCT/EP2010/054722, filed Apr. 9, 2010, published in German, which claims the benefit of the filing date of German patent application No. 10 2009 017 497.4 filed Apr. 16, 2009 and of U.S. Provisional Patent Application No. 61/169,822 filed Apr. 16, 2009, the entire disclosures of which are hereby incorporated herein by reference.

TECHNICAL FIELD

This invention relates to the water supply system of transportation means such as aircraft, trains, ships, boats, or travel trailers. In particular, the invention relates to a water supply module for a transportation means, by means of which water supply module water may be delivered to a faucet. The invention also relates to an installation system for a transportation means comprising a water supply module, to a method for installing a water supply module in a transportation means, to the use of a water supply module in a transportation means, and to a transportation means comprising a water supply module.

BACKGROUND TO THE INVENTION

Usually, transportation means that travel longer distances are equipped with galleys and lavatories. As a rule, each galley and each lavatory comprises a faucet from which the crew or the passengers of the transportation means may draw fresh water.

From DE 4 202 719 A1 and U.S. Pat. No. 5,261,440 A a water supply system for an aircraft is known, which water supply system comprises several faucets.

Faucets of different designs may differ by their connections or by the type of their actuating means, for example an infrared sensor or a mixing valve. Depending on the type of faucet it is thus necessary to route different lines. The lines to be routed may not only be water pipes of various designs but also signal lines between the actuating means of the faucet and a control unit. By means of the control commands received via the signal lines, the control unit may control the delivery of water from the faucet, for example by way of opening a valve.

Because of the different lines for different faucet designs, already prior to installation of the water supply system it must be determined which faucet is to be used in which position. Apart from this, subsequent retrofitting the transportation means is very expensive with respect to faucets.

SUMMARY OF THE INVENTION

It is the object of the invention to design the installation of the water supply system of a transportation means so that it is more flexible.

According to an embodiment of the invention, a water supply module for a transportation means is provided. The water supply module comprises a receiving connection for receiving water from a supply line, a delivery connection for delivering water to a faucet, a control connection for receiving control commands of an actuating element on the faucet, and a control unit, wherein the control unit is designed, on the basis of control commands of the actuating element, to adjust the delivery of water from the delivery connection to the faucet, and wherein the water supply module is designed as an assembly.

The water supply module as an assembly provides an integrated or combined water supply from, for example, a freshwater tank to a faucet. The base functions of the water supply may be integrated in a single compact device that may be integrated in the transportation means independently of the design type of the faucet.

Because the water supply module is designed as an assembly, i.e. comprises only few separate components, it may be attached to, or installed in, the transportation means with little expenditure. The installation expenditure relating to an assembly is reduced when compared to installation where the individual components of the assembly would have to be installed separately from each other in the transportation means.

Depending on the embodiment of the faucet or its actuating element, different control commands may be conveyed to the control unit. In the case of a faucet with an infrared sensor as an actuating element, these control commands could merely comprise "water on" and "water off". In the case of a faucet with a mixing valve or a mixer lever as an actuating element, these control commands may additionally comprise information relating to the quantity of the water to be delivered and to the temperature of the water to be delivered.

In the simplest case the control unit operates a valve dependent on the control commands of the actuating element, which valve either blocks or completely opens the delivery connection. The control unit may also be designed in such a manner that it may process the control commands of different actuating elements of faucets.

The actuating element of the faucets may be affixed or attached directly on the faucet, or it may be affixed in close proximity to the faucet on the transportation means or in a monument of the transportation means.

According to an embodiment the water supply module is designed for a monument of a transportation means. Such monuments comprise, for example, lavatory monuments or galley monuments. In this manner a modular design results, by means of which the installation expenditure relating to the water supply system of the transportation means may be reduced to a particularly great extent. The water supply module may already be attached in the monument before the monument is attached in the transportation means.

The supply line may be connected to a water tank which is, for example, present within the monument.

According to an embodiment the water supply module comprises a water heater. The control unit may be designed to activate or deactivate the water heater or to adjust its heat output. This makes it possible for the water supply module to be able to supply differently temperature-controlled water to the faucet. In this arrangement, controlling the water heater by means of the control unit may take place on the basis of control commands of the actuating means. For example, by means of a mixing valve, water of a particular temperature may be requested. The control unit may then adjust the water heater such that water is heated to a particular temperature.

According to an embodiment the water supply module comprises a mixing valve for mixing heated and non-heated water, wherein the control unit is designed, on the basis of control commands of the actuating means, to set a mixing ratio of the mixing valve. In this arrangement the water supplied to the mixing valve may originate from the water heater. With a mixing valve the water heater may be designed such that water is only heated to a particular temperature. Setting the desired water temperature then takes place by means of the mixing ratio of the mixing valve.

According to a further embodiment the water supply module comprises a pump for conveying the water to the delivery connection. The control unit may be designed to activate or deactivate the pump or to set the pump's delivery rate on the basis of control commands of the actuating means.

A pump in the water supply module provides the advantage of improved redundancy within the transportation means. If only one single pump is used to supply all the faucets of the transportation means, failure of this pump results in the need to immediately carry out maintenance on the transportation means. The transportation means may no longer be used, which may, for example, result in delays. If only a single pump fails, for example in a lavatory monument, then only this lavatory may need to be shut down during a journey, and maintenance work on the lavatory may be carried out later.

As an alternative or in addition to the pump, the water supply module may be supplied with compressed air or negative pressure, and conveying the water may take place by means of the compressed air or the negative pressure.

According to an embodiment the water supply module comprises a filter for filtering water delivered by the delivery connection.

According to an embodiment the water supply module comprises, for example, an active water treatment unit by means of which the water may be irradiated, e.g. by means of UV rays.

According to an embodiment the water supply module comprises a shut-off valve for closing the receiving connection. In this manner the water supply module may be isolated or disconnected from the supply line. In case of a fault, for example a leak, the module may be isolated from the water system in that the shut-off valve is closed.

According to a further embodiment the water supply module comprises a support element, wherein components of the water supply module are attached to the support element, wherein the support element is designed to be affixed to the transportation means.

The notion of "components of the water supply module" may refer to the control unit, the receiving connection, the delivery connection, the control connection, the water heater, the mixing valve, the filter, and the shut-off valve.

In order to install the water supply module in the transportation means it is no longer necessary to attach the individual components to the transportation means, but instead to attach only the support element.

The support element may be a support plate or a shared housing for the components.

According to an embodiment the support element may be designed to be attached to or in a monument.

According to an embodiment a water supply module is provided in which the delivery connection and the control connection are integrated in a shared standard module connection. In this manner connecting the faucet to the water supply module may take place in a single work step. The standard module connection may also be used for mechanically attaching the faucet to the water supply module.

The invention also relates to an installation system for a transportation means. The installation system comprises the water supply module and at least two faucets of different designs, wherein each of the at least two faucets is designed to be connected to the delivery connection and the control connection.

In this arrangement the different design of the faucets may relate either to the water connections or to the type of operation of the faucet. Irrespective as to whether a functional faucet for a galley with only cold water or a visually pleasing faucet for first class is selected from the installation system, or whether the actuating element on the faucet is an infrared sensor or an elaborate mixing valve by means of which the quantity and the temperature of the water to be delivered may be set, installation of the different faucets may be carried out with the same water supply module.

According to an embodiment an installation system is provided, wherein each of the at least two faucets of different designs comprises a standard faucet connection, wherein the standard faucet connection is designed to connect the faucet to the standard module connection.

The invention also relates to a method for installing a water supply module in a transportation means, which method involves the following steps: attaching the water supply module, which is designed as an assembly, to the transportation means; connecting the supply connection to the supply line; connecting the faucet to the delivery connection; connecting the faucet to the actuating means of the faucet.

With just a few work steps a functional faucet may be installed in the transportation means.

According to an embodiment of the method, attaching the water supply module to the transportation means comprises attaching a support element of the water supply module to the transportation means.

According to an embodiment of the method, connecting the faucet to the delivery connection, and connecting the actuating means to the control connection takes place in a single step by connecting the faucet to a standard module connection.

The invention also relates to the use of the water supply module in a transportation means or to the use of the water supply module in a monument of a transportation means.

The invention also relates to a transportation means comprising the water supply module.

Below, embodiments of the invention are described in detail with reference to the enclosed figures.

DETAILED DESCRIPTION OF THE EXEMPLARY EMBODIMENTS

Figure 1:
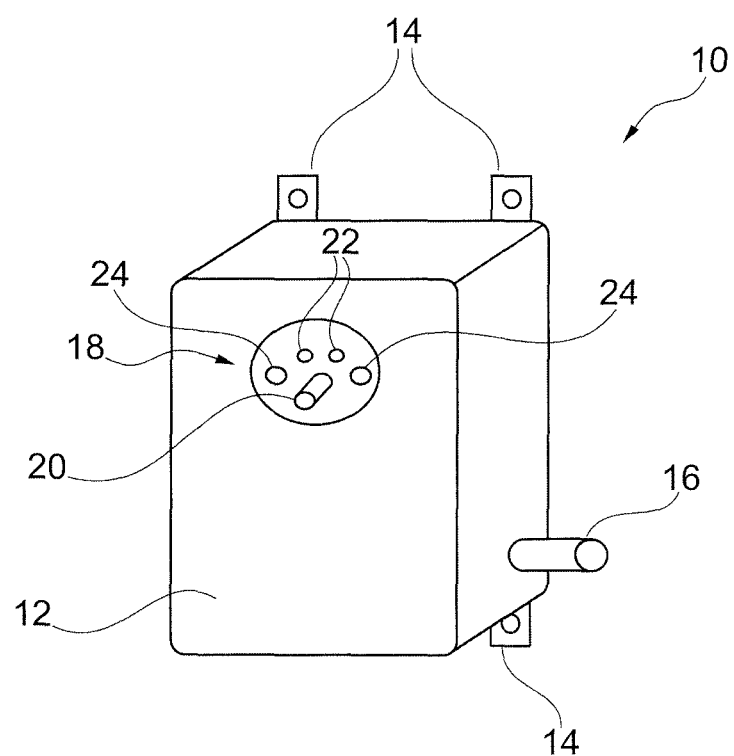
FIG. 1 shows a perspective view of a water supply module according to an embodiment of the invention.

FIG. 1 shows a perspective view of an embodiment of a water supply module. The water supply module 10 comprises a housing 12 that by means of attachment means or elements 14 may be attached to a transportation means or to a monument of the transportation means. The attachment means 14 are, for example, arranged in the region of the rear corners of the water supply module 10, with each attachment means 14 comprising a hole for receiving an attachment pin, bolt or screw. Within the housing 12 the components of the water supply module 10 are arranged. The water supply module 10 comprises a receiving connection 16 that may be connected to the supply line to a water tank.

Furthermore, the water supply module 10 comprises a standard module connection 18 in which a delivery connection 20; two control connections 22, for example connections for power transmission and data transmission; and two attachment devices 24, for example screw threads or snap-and-click connection elements, for a faucet are provided.

Figure 2A:
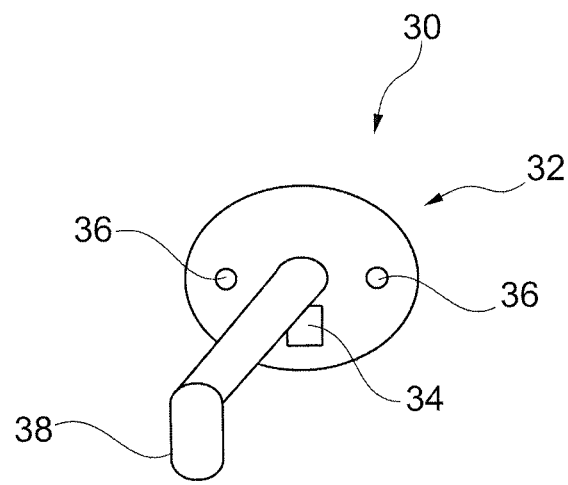
FIG. 2a shows a perspective view of an embodiment of a faucet.

FIG. 2*a* shows a faucet 30 that may be connected to the standard module connection 18. To this effect the faucet 30 comprises the standard faucet connection 32. The faucet 30 comprises an end pipe 38 that may be connected to the delivery connection 20 of the water supply module 10 and comprises an infrared sensor 34 that by way of one of the control connections 22 may issue control commands to a control unit in the water supply module 10.

In order to connect the faucet 30 to the water supply module 10 the faucet 30 is placed onto the standard module connection 18, and is, for example by means of screws through the opening 36, connected to the water supply module 10.

When the faucet 30 is installed, a person may hold their hands in front of the infrared sensor 34, and the infrared sensor 34 sends a corresponding control command to a control unit within the supply module 10, which then initiates delivery of water through the end pipe 38.

Figure 2B:
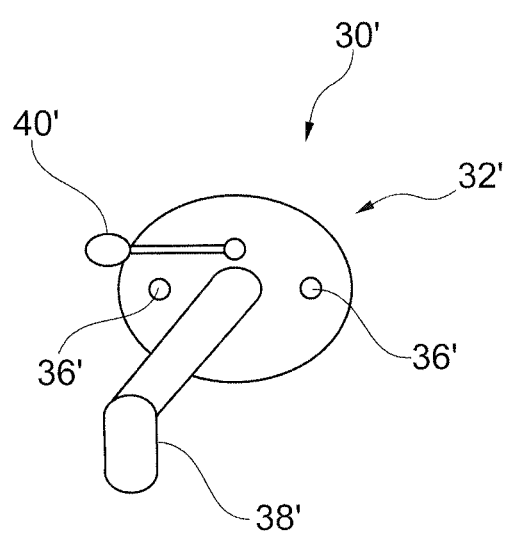
FIG. 2b shows a perspective view of a further embodiment of a faucet.

FIG. 2*b* shows a further embodiment of a faucet 30' which may be connected to the standard module connection 18. To this effect the faucet 30' comprises a standard faucet connection 32' which is identical to the standard faucet connection 32. The faucet 30' comprises an end pipe 38' and two openings 36' for connecting the faucet 30' to the water supply module 10.

In contrast to the embodiment of a faucet 30 shown in FIG. 2*a*, the faucet 30' shown in FIG. 2*b* comprises a mixer lever 40'. The mixer lever 40' as an actuating means may be connected to the control connections 22 of the water supply module 10. By putting the mixer lever 40' to different positions, control commands relating to the position of the mixer lever 40' are transmitted to a control unit of the water supply module 10, which control commands contain information relating to the temperature and the quantity of the water to be delivered.

Figure 3:
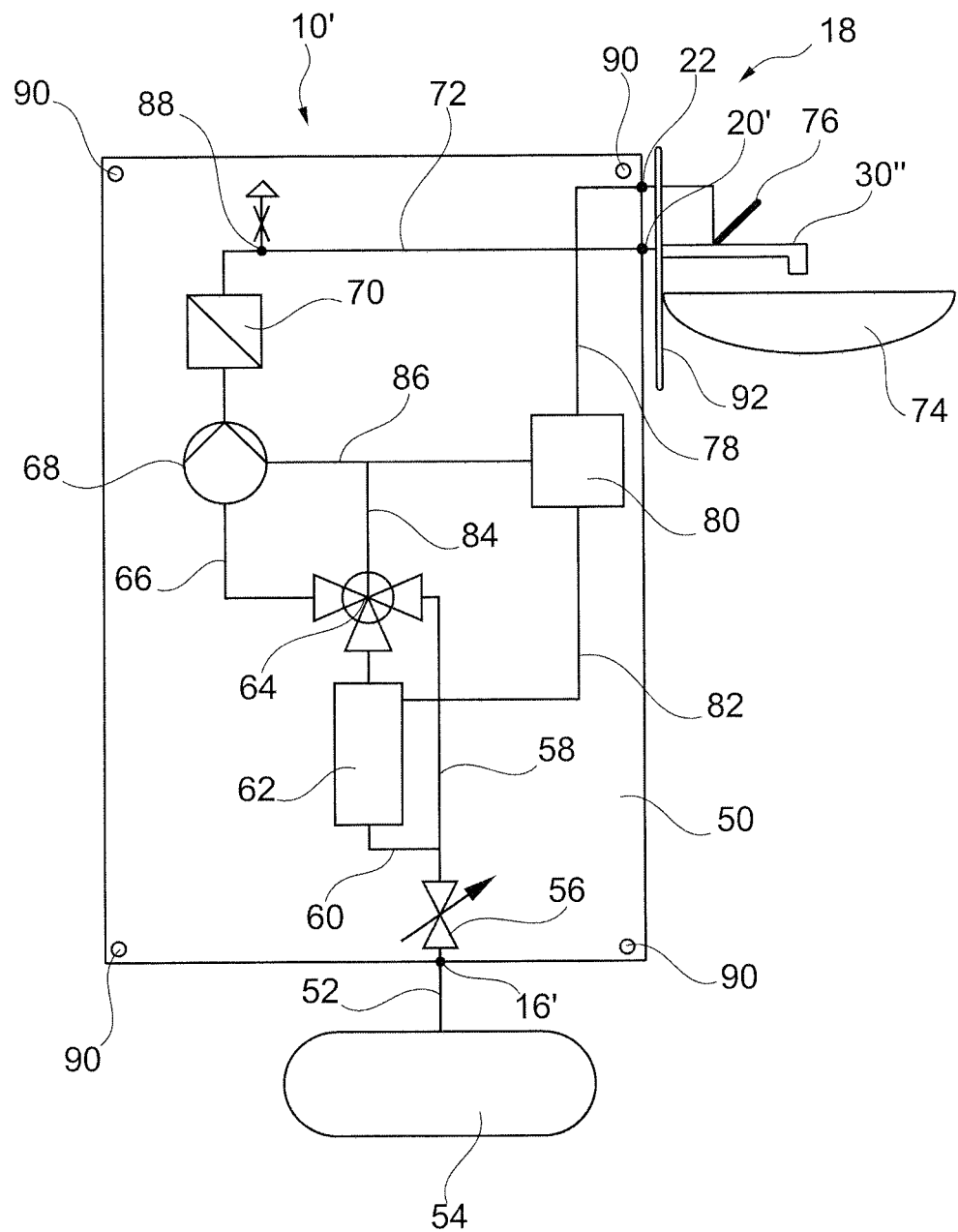
FIG. 3 shows a schematic view of a further embodiment of a water supply module.

FIG. 3 shows a diagrammatic view of a further embodiment of a water supply module 10'. All the components of the water supply module 10' may be contained in the water supply module 10 from FIG. 1.

The components of the water supply module 10' are attached to a support element 50 in the form of a support plate. The water supply module 10' comprises a receiving connection 16' by way of which the water supply module 10' may be supplied with water from a freshwater tank 54 by way of a supply line 52. Downstream of the receiving connection 16' the water supply module 10' comprises a shut-off valve 56 by means of which the receiving connection 16' may, for example, be manually closed. The water line emanating from the shut-off valve 56 splits into two water lines 58 and 60 by means of which the water from the tank 54 may be fed to a water heater 62 and a mixing valve 64. The mixing valve 64 mixes the water emanating from the water heater 62 and from the line 58 in order to convey it to a further line 66, which leads to an optional pump 68. The water conveyed by the pump passes through a filter 70 and is fed to the delivery connection 20' by way of a line 72. A faucet 30'' is connected to the delivery connection 20'. The water flowing from the faucet 30'' may be collected in a basin 74, which in turn is connected to the waste water system of the transportation means.

The actuating means 76 of the faucet 30'' is connected to a control unit 80 of the water supply module 10' over the control connection 22 and a signal line 78. The control unit 80 in turn is connected to the heating element 62 over a signal line 82, to the mixing valve 64 over a signal line 84, and to the pump 68 over a signal line 86. Depending on the control commands that the control unit 80 receives over the signal line 78, the control unit 80 controls the water heater 62, the mixing valve 64 and the pump 68.

If the actuating element 76 is, for example, a mixer lever, and if the lever is pushed upwards slightly, then the control unit 80 activates the water heater 62 and the pump 68, which then starts to convey water from the tank 54 to the delivery connection 20. Depending on the position of the mixer lever 76, the control device 80 controls the mixing valve 64 in such a manner that the water leaving the mixing valve 64 in the line 66, which water on the one hand emanates directly from the tank 54, and on the other hand by way of the line 60, has passed through the water heater 62 and has been heated to a particular temperature, with the water has the predetermined temperature as desired by placing the mixer lever 76 to a particular position.

The water supply module 10' shown in FIG. 3 furthermore comprises an air release valve 88 between the delivery connection 20' and the filter 70.

The support plate 50 may be attached to the transportation means or to a monument of the transportation means by way of the attachment means or elements 90 in the form of holes, for example by means of screws.

For the water supply module 10' that is shown in FIG. 3, a screen 92 is provided by means of which the assemblies behind the faucet 30' may be covered so that they are, for example, not visible to a passenger of the transportation means.

Figure 4:
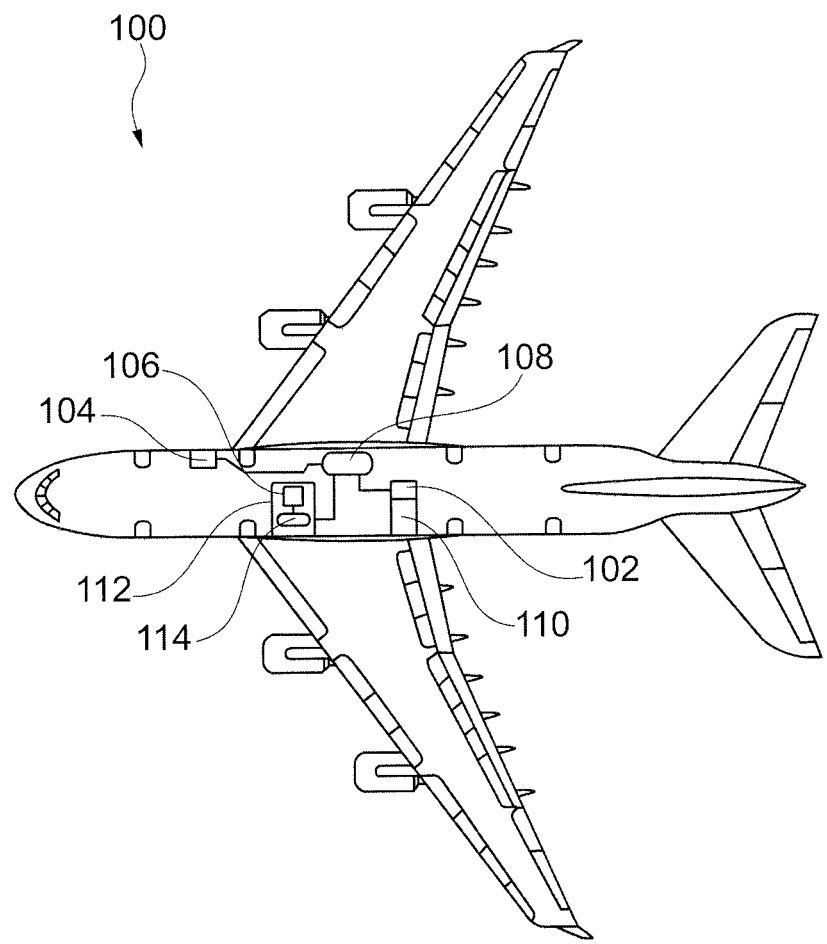
FIG. 4 shows an aircraft comprising an installation system according to an embodiment of the invention.

FIG. 4 shows a top view of an aircraft 100 which schematically shows part of the water supply system. The water supply modules 102 and 104 are connected, by way of lines, directly, and the water supply module 106 is connected indirectly, to a central freshwater tank 108. The water supply module 102 is attached to a galley monument 110, which in turn is attached to the aircraft 100. The water supply module 106 is attached to a lavatory monument 112 that is connected to the aircraft 100. The lavatory monument 112 comprises a separate freshwater tank 114 that by way of a line is connected to the central freshwater tank 108 of the aircraft 100. The water supply module 106 obtains its water from the tank 114 of the lavatory monument 112.

The water supply module 104 is attached directly to the aircraft 100.

Figure 5:
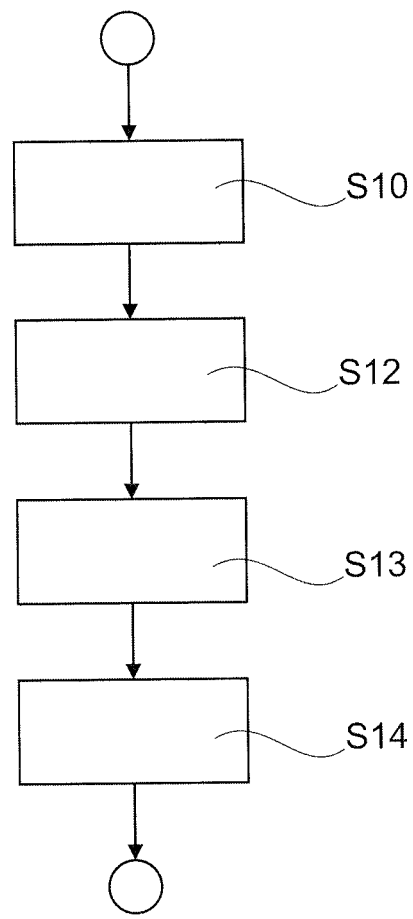
FIG. 5 shows a flow chart detailing the manner in which installation of a water supply module in a transportation means may take place.

FIG. 5 shows a flow chart setting out the manner in which one of the water supply modules 10 or 10' may be installed in the aircraft 100.

In step S10 the housing 12 or the support plate 50 is attached to the aircraft 100 or to a monument. Installation of the module may either take place in the monument at the monument manufacturer's, or may be installed later on directly in the aircraft. This depends on the installation situation in the aircraft.

In step S12 the receiving connection 16 or 16' is connected to one of the tanks 54, 114 or 108 by way of a supply line 52. In step S13 the faucet 30 or 30' with its standard faucet connection 32 or 32' is placed onto the standard connection 18 of the water supply module 10 or 10'. In step S14 the faucet 30 or 30' is attached to the water supply module 10 or 10', for example by means of screws or a snap-and-click connection.

In addition, it should be pointed out that "comprising" does not exclude other elements or steps, and "a" does not exclude a plural number. Furthermore, it should be pointed out that features or steps which have been described with reference to one of the above exemplary embodiments may also be used in combination with other features or steps of other exemplary embodiments described above. Reference characters in the claims are not to be interpreted as limitations.

The invention claimed is:

1. A system comprising:
a water supply module; and
a faucet,
wherein the water supply module comprises:
a receiving connection for receiving water from a supply line,
a delivery connection for delivering water to the faucet,
a control connection for receiving control commands of an actuating element in direct contact with the faucet,
a support element, and
a control unit;
wherein the delivery connection and the control unit are attached directly only to and supported directly by the support element;
wherein the support element is configured to be affixed to a transportation means;
wherein the control unit is configured, on the basis of control commands of the actuating element, to adjust the delivery of water from the delivery connection to the faucet; and
wherein the water supply module is configured as an assembly in a form of a single device to be integrated in the transportation means such that only the support element is directly attached to the transportation means or to a monument of the transportation means,
wherein the delivery connection and the control connection are integrated in a shared standard module connection of the water supply module,
wherein the faucet comprises a standard faucet connection, by which the faucet is releasably connected to the standard module connection of the water supply module,
wherein an end pipe of the faucet is directly connected to the standard faucet connection, such that the end pipe is directly connected to the delivery connection when connecting the standard faucet connection to the standard module connection.

2. The system of claim 1, where the water supply module further comprises:
a water heater attached directly only to and supported directly by the support element;
wherein the control unit is configured to activate or deactivate the water heater or to adjust heat output of the water heater.

3. The system of claim 1, where the water supply module further comprises:
a mixing valve for mixing heated and non-heated water, the mixing valve attached directly only to and supported directly b; the support element;
wherein the control unit is configured, on the basis of control commands of the actuating element, to set a mixing ratio of the mixing valve.

4. The system of claim 1, where the water supply module further comprises:
a pump for conveying the water to the delivery connection;
wherein the control unit is configured to activate or deactivate the pump or to set the pump's delivery rate on the basis of control commands of the actuating element.

5. The system of claim 1, where the water supply module further comprises:
a filter for filtering water delivered by the delivery connection.

6. The system of claim 1, where the water supply module further comprises:
a shut-off valve for closing the receiving connection.

7. The system of claim 1, wherein the delivery connection and the control connection are integrated in a shared standard module connection, so that connecting the faucet to the delivery connection and the actuating element to the control connection takes place in a single step by connecting the faucet to the standard module connection.

8. An installation system for a transportation means, comprising:
a water supply module with a support element and a receiving connection for receiving water from a supply line;
a delivery connection for delivering water to a faucet, the delivery connection attached directly only to and supported directly by the support element;
a control connection for receiving control commands of an actuating element in direct contact with the faucet; and
a control unit attached directly only to and supported directly by the support element;
wherein the control unit is configured, on the basis of control commands of the actuating element, to adjust the delivery of water from the delivery connection to the faucet;
wherein the water supply module is configured as an assembly in a form of a single device to be integrated in the transportation means; and
wherein the faucet comprises at least a first and a second faucet of different designs,
wherein each of the at least first and second faucets is configured to be connected to the delivery connection and the control connection such that only the support element is directly attached to the transportation means or to a monument of the transportation means,
wherein the delivery connection and the control connection are integrated in a shared standard module connection, such that connecting the faucet to the delivery connection and the actuating element to the control connection takes place in a single step by connecting the faucet to the standard module connection;
wherein each of the at least first and second faucets of different designs comprises a standard faucet connection, and
wherein the standard faucet connection is configured to releasably connect the faucet to the standard module connection, and
wherein an end pipe of each of the at least first and second faucets of different designs is directly connected to the standard faucet connection, such that each respective end pipe is directly connected to the delivery connection when connecting the respective standard faucet connection to the standard module connection.

9. A method for installing a water supply module in a transportation means, comprising:
attaching directly only a support element of the water supply module configured as an assembly in a form of a single device to be integrated in the transportation means to the transportation means or to a monument of the transportation means, the support element carrying and supporting directly a delivery connection and a control unit, wherein the delivery connection and the control connection are integrated in a shared standard module connection of the water supply module;
connecting a receiving connection attached to the support element to a supply line;
connecting a standard faucet connection of a faucet to the standard module connection of the water supply module, such that an end pipe of the faucet is directly connected to, the delivery connection of the standard faucet connection;
connecting the faucet to the delivery connection attached to the support element; and
connecting the faucet to an actuating element of the faucet in direct contact with the faucet.

10. The method of claim 9, wherein the step of attaching the water supply module to the transportation means comprises a step of attaching the support element of the water supply module to the transportation means.

11. The method of claim 9, wherein the steps of directly connecting the faucet to the delivery connection, and connecting the actuating element to a control connection takes place in a single step by connecting the faucet to a standard module connection.

12. A transportation means comprising a system comprising:
a water supply module; and
a faucet,
wherein the water supply module comprises:
a receiving connection for receiving water from a supply line;
a delivery connection for delivering water to a faucet;
a control connection for receiving control commands of an actuating element in direct contact with the faucet;
a support element; and
a control unit;
wherein the delivery connection and the control unit are attached directly only to and supported directly by the support element;
wherein the support element is configured to be affixed to the transportation means;
wherein the control unit is configured, on the basis of control commands of the actuating element, to adjust the delivery of water from the delivery connection to the faucet; and
wherein the water supply module is configured as an assembly in a form of a single device to be integrated in the transportation means such that only the support element is directly attached to the transportation means or to a monument of the transportation means,
wherein the delivery connection and the control connection are integrated in a shared standard module connection of the water supply module,
wherein the faucet comprises a standard faucet connection, by which the faucet is releasably connected to the standard module connection of the water supply module,
wherein an end pipe of the faucet is directly connected to the standard faucet connection, such that the end pipe is directly connected to the delivery connection when connecting the standard faucet connection to the standard module connection.

* * * * *